US012712314B2

(12) United States Patent
Stina et al.

(10) Patent No.: US 12,712,314 B2
(45) Date of Patent: Aug. 18, 2026

(54) CONNECTOR SAVER DEVICE AND METHOD

(71) Applicant: MacDonald, Dettwiler and Associates Inc., Brampton (CA)

(72) Inventors: Nick Stina, Brampton (CA); Max Glidden, Brampton (CA)

(73) Assignee: MacDonald, Dettwiler and Associates Inc., Brampton (CA)

(*) Notice: Subject to any disclaimer, the term of this patent is extended or adjusted under 35 U.S.C. 154(b) by 307 days.

(21) Appl. No.: 18/540,117

(22) Filed: Dec. 14, 2023

(65) Prior Publication Data

US 2024/0204446 A1 Jun. 20, 2024

Related U.S. Application Data

(60) Provisional application No. 63/432,590, filed on Dec. 14, 2022.

(51) Int. Cl.

*H01R 13/518* (2006.01)
*H01R 13/502* (2006.01)
*H01R 13/621* (2006.01)
*H01R 13/642* (2006.01)
*H01R 43/20* (2006.01)

(52) U.S. Cl.

CPC ......... *H01R 13/518* (2013.01); *H01R 13/502* (2013.01); *H01R 13/621* (2013.01); *H01R 13/642* (2013.01); *H01R 43/20* (2013.01)

(58) Field of Classification Search

CPC .. H01R 13/518; H01R 13/502; H01R 13/621; H01R 13/642; H01R 13/64; H01R 13/6215; H01R 43/20

USPC ...................... 439/378, 362, 364, 540.1, 680

See application file for complete search history.

(56) References Cited

U.S. PATENT DOCUMENTS 3,718,887 A * 2/1973 Solomon et al. ...... H01R 24/20 439/362
5,378,173 A 1/1995 Hashizawa
5,647,758 A * 7/1997 Ichikawa ........... H01R 13/6215 439/364

(Continued)

FOREIGN PATENT DOCUMENTS

DE 4447719 C2 2/1999
EP 3232511 A1 10/2017

OTHER PUBLICATIONS

Extended European Search Report issued on European Patent Application No. 23216922.7 on May 3, 2024.

*Primary Examiner* — Gary F Paumen

(74) *Attorney, Agent, or Firm* — Own Innovation; James W. Hinton; Kent C. Howe

(57) ABSTRACT

Connector savers and associated methods are provided. A connector saver includes a body comprising first and second apertures, a first connector disposed on a surface of the body and for transmitting electrical current, and first and second jacking fasteners for securing the connector saver and removing the connector saver. The first jacking fastener is for disposing in the first aperture and the second jacking fastener is for disposing in the second aperture. Each of the first and second jacking fasteners include a retaining element coupled to a shaft of the respective jacking fastener that is configured such that the respective jacking fastener is not separable from the body.

20 Claims, 13 Drawing Sheets

(56) References Cited

U.S. PATENT DOCUMENTS

| | | | | |
|---|---|---|---|---|
| 6,520,791 | B2 * | 2/2003 | Burger | H01R 13/6215 439/362 |
| 6,530,801 | B2 * | 3/2003 | Bates | G02B 6/3878 439/364 |
| 7,950,942 | B2 * | 5/2011 | Klinger | H01R 13/6215 439/247 |
| 8,152,557 | B2 * | 4/2012 | Blanton | H01R 13/6215 439/362 |
| 8,517,756 | B2 * | 8/2013 | Song | H01R 13/6271 439/680 |
| 9,673,559 | B1 * | 6/2017 | Rossman | H01R 12/7011 |
| 10,028,391 | B1 * | 7/2018 | Reynoso Galvan | H05K 5/0052 |
| 10,958,014 | B1 * | 3/2021 | Martin | H01R 13/6215 |
| 2002/0173195 | A1 | 11/2002 | Burger | |
| 2007/0275604 | A1 | 11/2007 | Van Meijl et al. | |

* cited by examiner

CONNECTOR SAVER DEVICE AND METHOD

TECHNICAL FIELD

The following relates generally to connector savers, and more particularly to systems, methods, and devices for connector savers configured for use in space environments.

INTRODUCTION

Electrical connector components (also referred to herein as "connectors") are commonly used in many systems where electrical contacts are required for power or data transmission between components. Electrical connectors on space robotics, payload, and tooling interfaces may experience degradation from in-service operations, environmental exposure, and incidental damage from unpredicted events.

Connectors may only be rated for a certain number of connection cycles. For example, a connector may only be mated and unmated 100 times before mechanical or electrical degradation arises, such that the mechanical or electrical performance of the connector is degraded. The number of rated connection cycles may be lower when a connector is subjected to harsh environments, such as environments including abrasive dusts and extreme temperatures.

Typically, such connectors in space applications are integrally secured to a harness cable which may be inaccessible within orbiting space structures. In some installations, an array of fasteners and retention features must be removed to access the deteriorated component, which can require sophisticated methods and result in the procedure being deemed unfeasible or impractical.

Further, such connectors may be integrated into expensive, complicated, or difficult-to-service equipment, and may be deemed to be non-serviceable. Replaceable connector savers may be applied to reduce the number of cycles to which a non-serviceable connector is directly subjected. However, such connector savers are not well adapted for use in dusty or harsh environments such as outer space. Further, historical space explorations which utilized electrical connectors in robotics, payloads, and tooling, have been less likely to benefit from connector savers either due to short life-cycle requirements, less harsh environmental conditions, or other reasons.

Accordingly, there is a need for an improved connector saver that overcomes at least some of the disadvantages of existing connector savers, and for connector savers which may be well adapted for use in space applications.

SUMMARY

A connector saver device for an electromechanical interface is provided. The connector saver device comprises a body, the body comprising first and second apertures, a first connector, disposed on a surface of the body, for transmitting electrical current, and a first jacking fastener and a second jacking fastener for securing the connector saver to a target connector and removing the connector saver from the target connector, the first jacking fastener for disposing in the first aperture and the second jacking fastener for disposing in the second aperture, each of the first and second jacking fasteners further comprising a retaining element coupled to a shaft of the respective jacking fastener, the retaining element configured such that (i) the retaining element prevents the respective jacking fastener from being separated from the body when the jacking fastener is disposed in the respective aperture, and (ii) the retaining element applies a jacking force to the body when the respective jacking fastener is loosened, thereby jacking the body away from the target connector to facilitate removal of the connector saver.

According to some embodiments, the connector saver further comprises a redundant connector disposed on the surface of the body, and wherein the first connector and the redundant connector each comprise two connectors.

According to some embodiments, the connector saver further comprises a tethering point coupled to the body, the tethering point for securing the connector saver to an external mounting point.

According to some embodiments, the connector saver further comprises an alignment port for aligning the connector saver during mating to the target connector, the alignment port configured to mate with a corresponding alignment feature of the target connector.

In some embodiments, the first and second jacking fasteners are captive fasteners.

In some embodiments, each of the first and second jacking fasteners are a bolt or a screw.

In some embodiments, the body of the connector saver is shaped to conform to and cover a body of the target connector when the connector saver is secured to the target connector.

In some embodiments, the alignment port comprises a recess with a tapered or conical profile and the alignment feature is an alignment pin with a tapered or conical tip.

In some embodiments, the connector saver further includes first and second alignment ports for aligning the connector saver during mating to the target connector, the first and second alignment ports configured to mate with respective first and second alignment features on the target connector, wherein the first and second alignment ports are offset from one another.

In some embodiments, the offset includes having the first and second alignment ports generally opposite one another along a perimeter of the body.

In some embodiments, the first aperture, the second aperture, and the alignment port are disposed such that the first jacking fastener, the second jacking fastener, and the alignment feature are substantially parallel to one another when the connector saver is secured to the target connector.

In some embodiments, the first and second jacking fasteners each include a threaded portion that is received by a threaded receiver on the target connector.

In some embodiments, the retaining element is an annular or disc shaped element protruding from a body of the respective jacking fastener.

In some embodiments, the connector saver further includes at least two grooves or channels in the body of the connector saver that promote alignment with the target connector when mating.

In some embodiments, the at least two grooves or channels includes a first groove or channel and a second groove or channel that are offset from one another.

A method of operating a connector saver is also provided. The method includes providing a target connector and the connector saver. The connector saver includes a body comprising first and second apertures, a first connector disposed on a surface of the body and for transmitting electrical current, and a first jacking fastener and a second jacking fastener for securing the connector saver to a target connector and removing the connector saver from the target connector. The first jacking fastener is for disposing in the first aperture and the second jacking fastener is for disposing in the second aperture. Each of the first and second jacking fasteners further include a retaining element coupled to a shaft of the respective jacking fastener. The retaining element is configured such that (i) the retaining element prevents the respective jacking fastener from being separated from the body when the jacking fastener is disposed in the respective aperture, and (ii) the retaining element applies a jacking force to the body when the respective jacking fastener is loosened, thereby jacking the body away from the target connector to facilitate removal of the connector saver. The connector saver is coupled to the target connector and the jacking fasteners are in a torqued position. The method further includes loosening the jacking fasteners to jack the connector saver away from the target connector and decoupling the connector saver from the target connector.

A method of protecting an electrical connector is also provided. The method includes aligning a connector saver with a target connector. The target connector includes a first target connector. The saver includes a body comprising first and second apertures, a first connector disposed on a surface of the body and for transmitting electrical current, and first and second jacking fasteners for securing the connector saver to a target connector and removing the connector saver from the target connector. The first jacking fastener is for disposing in the first aperture and the second jacking fastener is for disposing in the second aperture. Each of the first and second jacking fasteners further includes a retaining element coupled to a shaft of the respective jacking fastener, the retaining element configured such that (i) the retaining element prevents the respective jacking fastener from being separated from the body when the jacking fastener is disposed in the respective aperture, and (ii) the retaining element applies a jacking force to the body when the respective jacking fastener is loosened, thereby jacking the body away from the target connector to facilitate removal of the connector saver. The method further includes coupling the first connector of the connector saver to the first target connector of the target connector, tightening the first and second jacking fasteners to secure the connector saver to the target connector, and loosening first and second jacking fasteners, thereby jacking the connector saver away from the target connector.

According to some embodiments, the aligning comprises aligning alignment features of the target connector with respective complimentary alignment ports of the connector saver.

According to some embodiments, the coupling comprises mating alignment features of the target connector with respective complimentary alignment ports of the connector saver which when mated, urge the connector saver into alignment with the target connector.

A method of manufacturing a connector saver for an electromechanical interface, the connector saver configured to couple to a target connector, is also provided. The method includes inserting a first fastener into a first aperture of a body of the connector saver and a second fastener into a second aperture of the body. The method further includes coupling a first retaining element to a shaft of the first fastener and a second retaining element to a shaft of the second fastener when the first and second fasteners are inserted into the first and second apertures, to form a first jacking fastener and a second jacking fastener, the retaining elements preventing each respective jacking fastener from removal from each respective aperture by mechanically interfering with the body.

According to some embodiments, the connector saver is configured such that when the connector saver is coupled to the target connector and the jacking fasteners are torqued, the retaining element applies a jacking force to the body when each respective jacking fastener is loosened, thereby jacking the body away from the target connector to facilitate removal of the connector saver.

Other aspects and features will become apparent, to those ordinarily skilled in the art, upon review of the following description of some exemplary embodiments.

BRIEF DESCRIPTION OF THE DRAWINGS

The drawings included herewith are for illustrating various examples of articles, methods, and apparatuses of the present specification. In the drawings.

DETAILED DESCRIPTION

Figure 1:
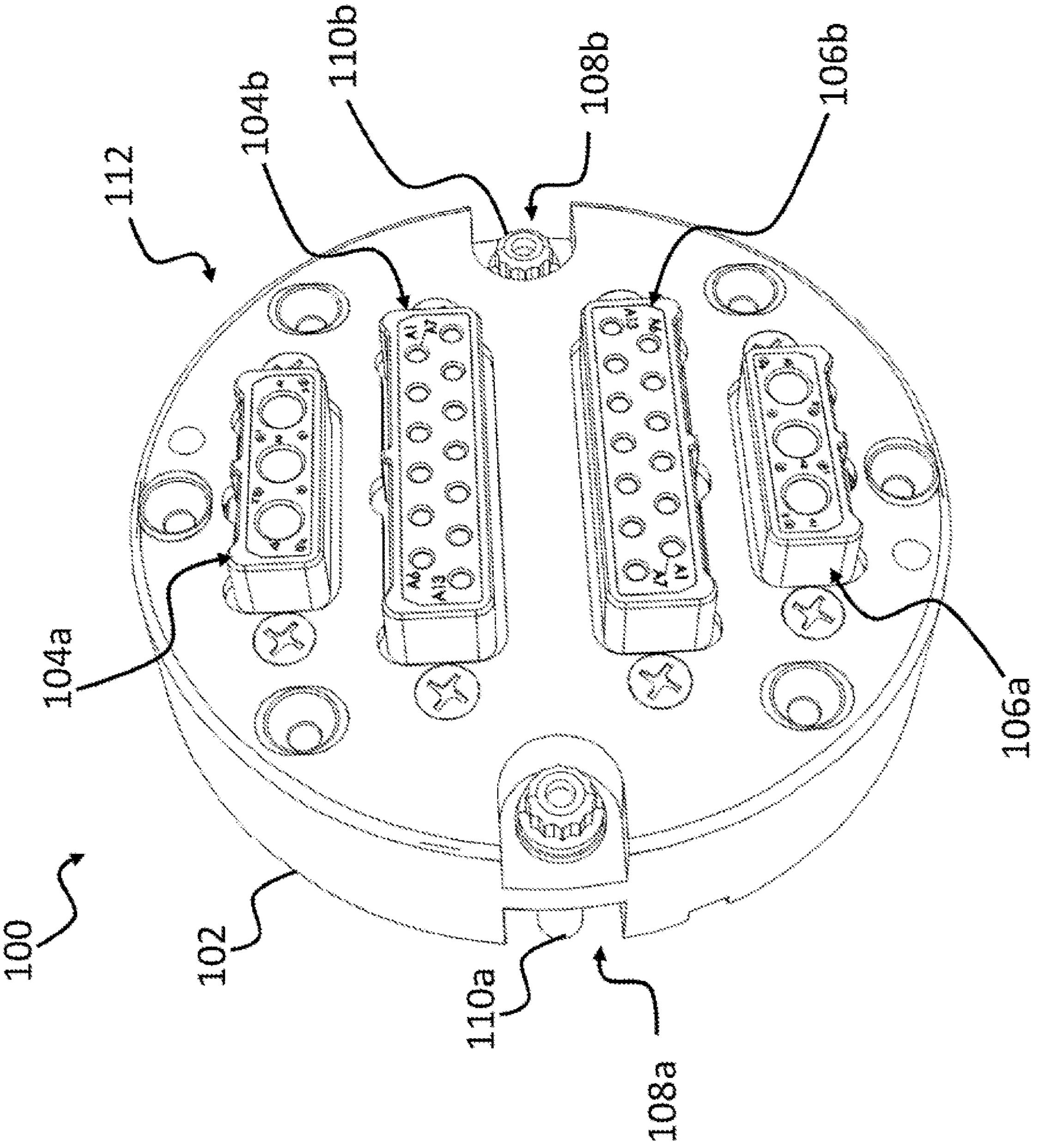
FIG. 1 is a front perspective view of a connector saver, according to an embodiment.

Various apparatuses or processes will be described below to provide an example of each claimed embodiment. No embodiment described below limits any claimed embodiment and any claimed embodiment may cover processes or apparatuses that differ from those described below. The claimed embodiments are not limited to apparatuses or processes having all of the features of any one apparatus or process described below or to features common to multiple or all of the apparatuses described below.

Further, although process steps, method steps, algorithms, or the like may be described (in the disclosure and/or in the claims) in a sequential order, such processes, methods, and algorithms may be configured to work in alternate orders. In other words, any sequence or order of steps that may be described does not necessarily indicate a requirement that the steps be performed in that order. The steps of processes described herein may be performed in any order that is practical. Further, some steps may be performed simultaneously.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article.

The following relates generally to an electromechanical interface, and more particularly to a connector saver device and associated methods. The connector saver device may be particularly suitable for use in space-based applications and microgravity environments, such as on-orbit servicing with extravehicular activity and extravehicular robotics operations.

The connector saver device described herein comprises a device with a female connector on one end and a male connector on the other end. The connector saver device is configured to couple to a connector permanently installed on a device or system to reduce the number of connector coupling cycles to which the permanent connector is exposed. The connector saver may be attached to the permanent connector, and repeated connections may be made with the connector saver instead of the permanent connector. Once the connector saver has been subjected to a certain number of connection cycles resulting in connector saver degradation, the connector saver may be replaced.

For example, the connector saver may be coupled to the permanent connector, then subjected to 1000 cycles, and replaced. In such an example, the permanent connector has only been subjected to one connection cycle. Accordingly, the use of the connector saver may extend the life of the permanent connector 1000-fold in this example. In other examples, the connectors may be rated for a different number of cycles, and therefore, the longevity improvement associated with the connector saver may vary accordingly.

The connector saver of the present disclosure further comprises additional features to improve the suitability of the connector saver for space applications. The connector saver is configured to attach to the permanent connector using captive fasteners (e.g., screws or bolts). The captive fasteners may conform to NASA or other EVA standards (e.g., ESA ECSS debris standard). The captive fasteners provide both a fastening function (for fastening the connector saver to the connector) and, in some embodiments, a jacking function for jacking the connector saver away from a permanent connector upon extraction, thereby improving the ease of removal of the connector saver. The jacking function of the captive fastener may be provided by a retaining element or element disposed on the captive fastener. Such features of the connector saver reduce the number of touchpoints and touch-time in assembly, improving service time and cost. In embodiments of the connector saver of the present disclosure that include an integral jacking function (e.g., via jacking fastener), the removal functionality of an active (e.g., robotic) system may be considerably simplified. In some embodiments, the jacking functionality of the connector saver device may not be present and may be moved over to the system that is performing the removable and replacement.

The connector saver includes redundant connector pairs, improving reliability in dusty environments. The connector saver may further comprise a tethering point, which may be required for use in microgravity environments.

The connector saver of the present disclosure is disposable/replaceable. If the saver gets contaminated, such as by dust (e.g., lunar dust), or replacement is scheduled, the connector saver can be removed and replaced. The replaced part may be discarded or refurbished for future use. So, while the connector saver may become contaminated through use (e.g., by dust), the connector saver provides a barrier to contamination of the "parent" connector.

The connector saver of the present disclosure permits the replacement of the connector as a modular assembly which requires limited operations for removal and replacement.

The connector saver of the present disclosure permits space servicing with the use of limited human and robotic availability in extra-vehicular activity and extra-vehicular robotics operations.

In some examples, the permanent connector may be referred to as a target connector.

A replaceable connector saver is disclosed herein, which allows the discrete removal and replacement of the same, while in an orbiting space environment.

The connector saver described herein permits the salvage of space operations and robotics which depend on adequately functioning connectors. In situations where degradation occurs, the connector saver module may be replaced without the need to dismantle a large number of components, thereby reducing out-of-service periods.

The connector saver described herein permits the use of on-orbit servicing with extra-vehicular activity & extra-vehicular robotics operations.

Figure 2:
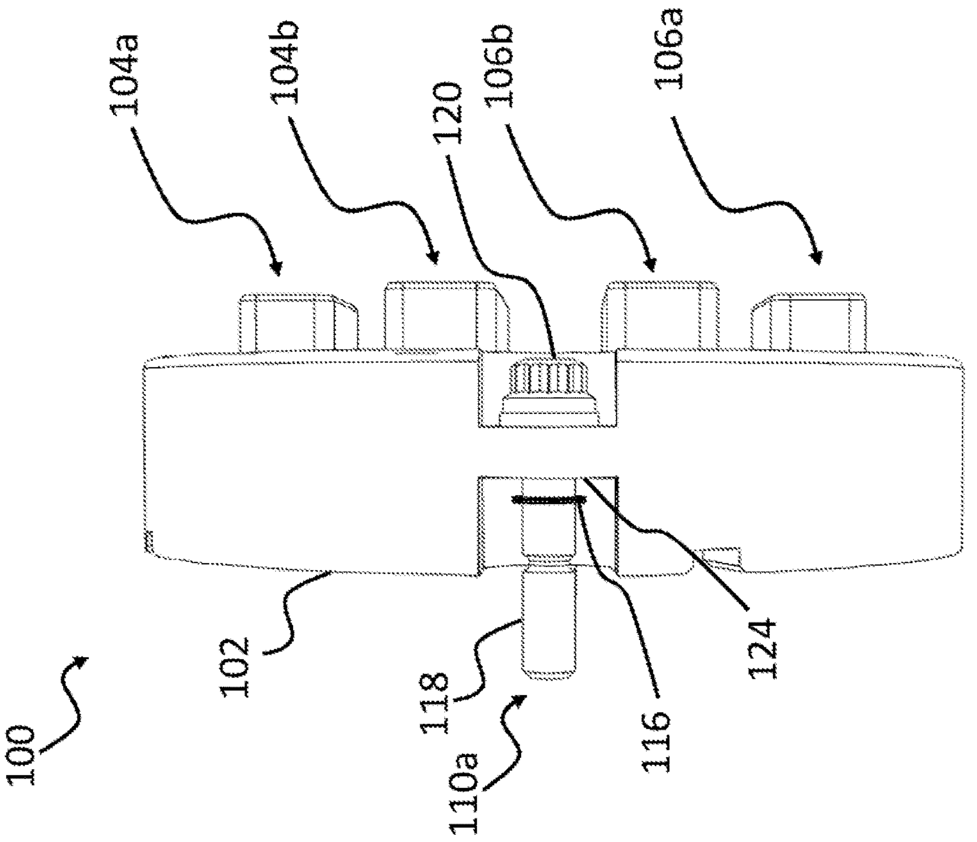
FIG. 2 is a side view of the connector saver of FIG. 1, according to an embodiment.
Figure 3:
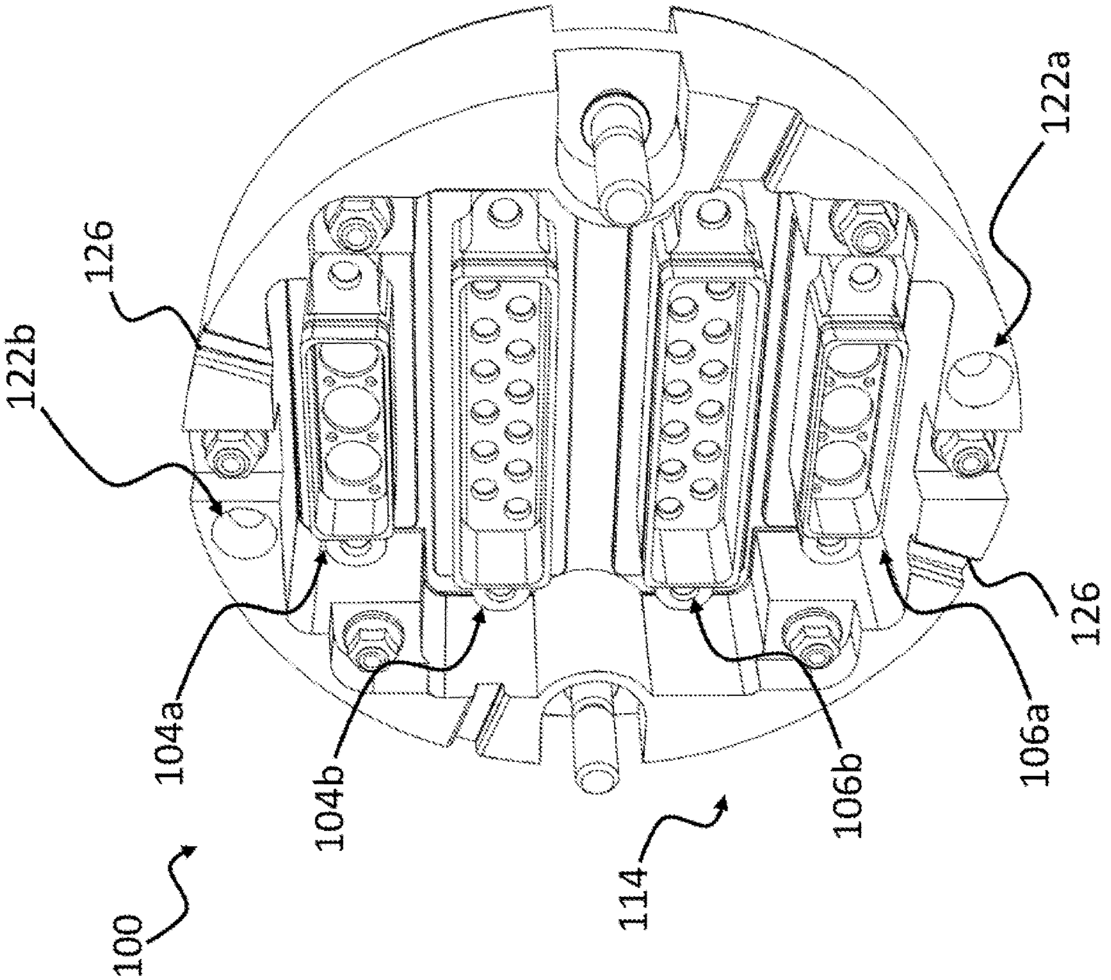
FIG. 3 is a rear perspective view of a connector saver of FIGS. 1-2, according to an embodiment.

Referring now to FIGS. 1 to 3, shown therein are front perspective, side, and rear perspective views of a dust tolerance connector saver device 100, according to an embodiment.

Device 100 comprises body 102, primary connectors 104*a* and 104*b*, secondary connectors 106*a* and 106*b*, first and second apertures 108*a* and 108*b*, first and second jacking fasteners 110*a* and 110*b*, and first and second alignment ports 122*a* and 122*b*. First and second apertures 108*a* and 108*b* may be collectively referred to as apertures 108.

Body 102 comprises the overall mechanical housing of device 100. In the embodiment of FIG. 1, body 102 comprises a generally cylindrical form, approximately four inches in diameter, and one inch in thickness. Body 102 is constructed from machined aluminum metal. In other embodiments, body 102 may comprise other shapes and sizes, and may be constructed from any other suitable material.

Body 102 may be divided into external surface 112 and internal surface 114. When in operation, device 100 exposes external surface 112 for the reception of a connector, while internal surface 114 remains connected to a target connector.

The connector saver device 100 is configured to be sufficiently conforming to the parent connector to protect the parent connector from contamination. In this way, the connector saver device 100 presents a barrier from ballistic or surface transmitted contamination by regolith impinging on the protected connector interface.

The grooves or channels 126 on the back of the body 102 may serve as alignment features in the absence of alignment pins 222*a*, 222*b* and aid as positive alignment features. In some embodiments, the grooves/channels may not be present.

In some examples, device 100 further comprises a tether point (not pictured). The tether point may be coupled to or integral to body 102. The tether point provides for a hardware mounting point, allowing an operator to tether device 100, such that device 100 may not be misplaced or change position. The presence of a tether point may be particularly advantageous in space applications, wherein microgravity conditions may require device 100 to be tethered during use. The tether point may comprise a solid loop or aperture within body 102 which may allow for connection to a carabiner or other similar device.

The device 100 includes primary connectors 104*a*, 104*b*, and secondary connectors 106*a*, 106*b*. Primary connectors 104*a*, 104*b* and secondary connectors 106*a*, 106*b* are referred to collectively as primary connectors 104 and secondary connectors 106, and generically as primary connector 104 and secondary connector 106. The primary connectors 104*a*, 104*b* and secondary connectors 106*a*, 106*b* are coupled to body 102. In the embodiment of FIGS. 1-3, primary connectors 104*a*, 104*b*, and secondary connectors 106*a*, 106*b* each comprise two separate electrical connectors: 104*a*, 104*b* and 106*a*, 106*b*. Primary connectors 104 and secondary connectors 106 comprise pass through connectors, or connector extenders, such that one side of each of primary connector 104 and secondary connector 106 comprises a male format connector (internal surface 114 side), while the other side comprises a female format connector (external surface 112 side).

Primary connectors 104 and secondary connectors 106 may comprise any connector type or format configured to transmit electrical power or data. Connectors 104*a* and 106*a* are configured to transmit data and connectors 104*b* and 106*b* are configured to transmit electrical power. In other embodiments, connector application and configurations may differ.

Primary connectors 104 and secondary connectors 106 may comprise redundant connectors, such that primary connectors 104 and secondary connectors 106 are coupled to the same circuits. Such redundancy may be particularly advantageous in space applications, where servicing connectors may require expensive or complicated processes, such as extra-vehicular space operations. While the device 100 of FIG. 1 includes primary and secondary connectors 104, 106, in some embodiments, the device may include only one set of connectors (e.g., only primary connectors 104*a*, 104*b*).

In variations, the connectors 104, 106 may be commercial off the shelf (COTS) or custom. In some embodiments, the device 100 may include a compliance feature that allows the connectors 104, 106 (as a whole) to mate and shift as needed to avoid binding or damage due to misalignments of the target connector 200 (e.g., of FIG. 4) and connector saver 100. Misalignments may occur due to dimensional tolerance variations or thermal differential movements in the orbiting space environment.

The device 100 includes apertures 108. Apertures 108 are present on body 102 and extend through body 102 from external surface 112 to internal surface 114. Apertures 108 are circular in shape, and of a constant cross section through body 102. Apertures 108 are configured to receive jacking fasteners 110. For example, the diameter of each aperture 108 is greater than the largest outer diameter of the jacking fasteners 110. In variations, the apertures 108 may vary in shape and/or position. In some embodiments, such as shown in FIG. 1, the apertures 108 may be configured to allow the fastener 110 to be recessed within device 100, wherein fastener 110 does not protrude past the surface of body 102 when device 100 is mated to a target connector. Such a configuration may reduce the likelihood of fastener 110 interfering or colliding with external components, such as a connector which is to be coupled to device 100.

The device 100 further includes jacking fasteners 110*a*, 110*b* (referred to collectively as jacking fasteners 110 and generically as jacking fastener 110). Jacking fasteners 110 comprise mechanical fasteners, with threaded portion 118 and fastener head 120. Threaded portion 118 extends from the tips of jacking fasteners 110 up to a recess within a shaft of jacking fastener 110. The remaining portions of jacking fasteners 110 may be smooth and unthreaded. Fastener heads 120 may be fastener heads compatible with EVA tools and standards. While device 100 of FIG. 1 includes two jacking fasteners, in other embodiments, the connector saver of the present disclosure may include more than two jacking fasteners.

Jacking fasteners 110 may be constructed from any mechanically appropriate material, such as aluminum, titanium, stainless steel, or other materials.

Figure 6:
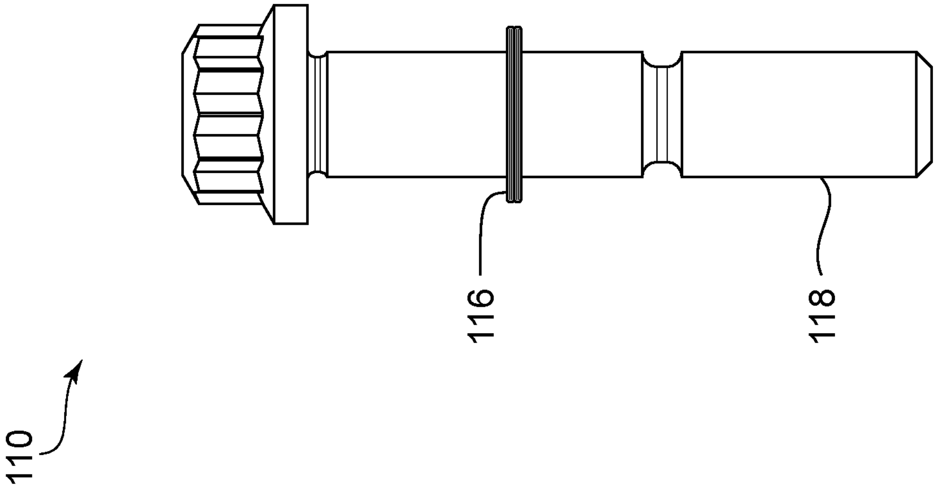
FIG. 6 is a front view of a jacking fastener for use with the connector saver of FIGS. 1-3, according to an embodiment.

Each jacking fastener 110 further includes a retaining element 116. Each retaining element 116 is coupled to a jacking fastener 110 after the jacking fastener 110 has been inserted into an aperture 108. In doing so, the jacking fastener 110 cannot be removed from the aperture 108 without removing the retaining element 116, as the retaining element 116 mechanically interferes with the material surrounding aperture 108 of body 102. The presence of retaining elements 116 ensure that jacking fasteners 110 cannot be separated from device 100. This can be particularly advantageous in environments such as space or other microgravity environments, wherein unsecured objects may be at risk of misplacement. In an embodiment, such as shown in FIG. 6, the retaining element 116 may be an annular or disc-shaped element or member that protrudes from a body of the jacking fastener. The annular, ring, or disc-shaped element may be flat on the side that faces the fastener head 120. For example, the retaining element 116 may be a thin, flat disc that protrudes around a circumference of a cylindrical body of the fastener. The disc may be separate from and configured to receive the fastener body therethrough. In other embodiments, the retaining element 116 may be a ridge, lip, rim, flange, or any other structure the protrudes from the body of the fastener (e.g., making its diameter greater at that point) and that provides sufficient structure to prevent separation of the jacking fastener 110 from the device 100 and provide sufficient jacking functionality (as described herein).

In the embodiment of FIGS. 1 to 3, the device 100 includes two jacking fasteners 110 for redundancy. This can be particularly advantageous in certain high-risk applications, such as space-based applications, wherein servicing connectors may require expensive or complicated processes, such as extra-vehicular space operations. In other examples, other structures may provide for redundancy, and more or fewer jacking fasteners 110 may be applied.

The device 100 includes alignment ports 122*a*, 122*b* (referred to collectively as alignment ports 122 and generically as alignment port 122). Alignment ports 122 comprise recesses within body 102. The recess may have a tapered or conical profile. Alignment ports 122 are configured to receive alignment features of a target connector, to guide the mating of device 100 with a target connector. The alignment ports 122 may be positioned in an offset pattern (an example of which is shown in FIG. 1) for "mistake proofing" and based on available space on the connector.

For example, device 100 may be brought to close proximity of the target connector. In doing so, alignment ports 122 are brought into contact with alignment features of the target connector. Device 100 may be brought closer to the target connector. The conical or tapered profile of alignment ports 122 urge device 100 and the target connector into an aligned or desired relative position as they are brought together, such that connectors 104, 106 of device are in a correct position to mate with corresponding connectors of the target connector.

Figure 4:
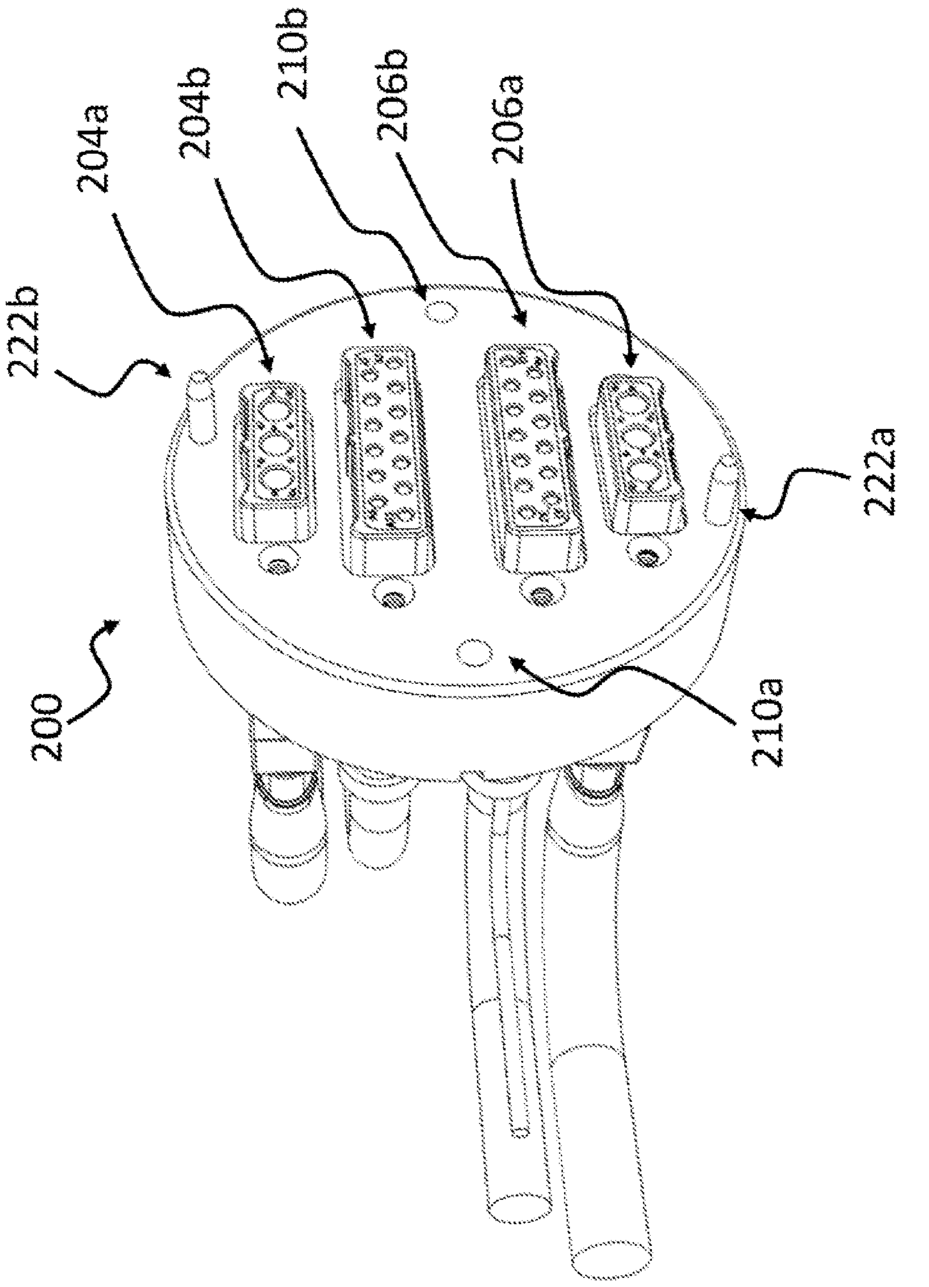
FIG. 4 is a front perspective view of a target connector for use with the connector saver of FIGS. 1-3, according to an embodiment.

Referring now to FIG. 4, shown therein is a target connector 200, according to an embodiment. Device 100 is particularly configured to mate with target connector 200 and to act as a connector saver to target connector 200. Connector 200 includes primary connectors 204*a*, 204*b*, secondary connectors 206*a*, 206*b*, threaded apertures 210*a*, 210*b*, collectively referred to as apertures 210 and generically as aperture 210), and alignment pins 222*a*, 222*b*, collectively referred to as alignment pins 222 and generically as alignment pin 222.

Primary connectors 204*a*, 204*b* comprise female format connectors configured to mate with male portions of primary connectors 104*a*, 104*b*.

Secondary connectors 206*a*, 206*b* comprise female format connectors configured to mate with male portions of secondary connectors 106*a*, 106*b*.

Threaded apertures 210 comprise apertures with threaded interior surfaces compatible with threaded portions 118 of jacking fasteners 110. Threaded apertures 210 are positioned such that jacking fasteners 110 can engage threaded apertures 210 when device 100 is mated to target connector 200.

Alignment pins 222 comprise mechanical alignment features protruding from connector 200 that are configured to interface with alignment ports 122 of device 100 (as described above). Alignment pins 222 may include tapered or conical tips, to improve ease of aligning and/or mating the alignment pins 222 with alignment ports 122. In some embodiments, the alignment pins 222 may be oval shaped, such that differential thermal movements may allow the bodies 100, 200 to shift without inducing excessive strains on the alignment pins 222.

Figure 5:
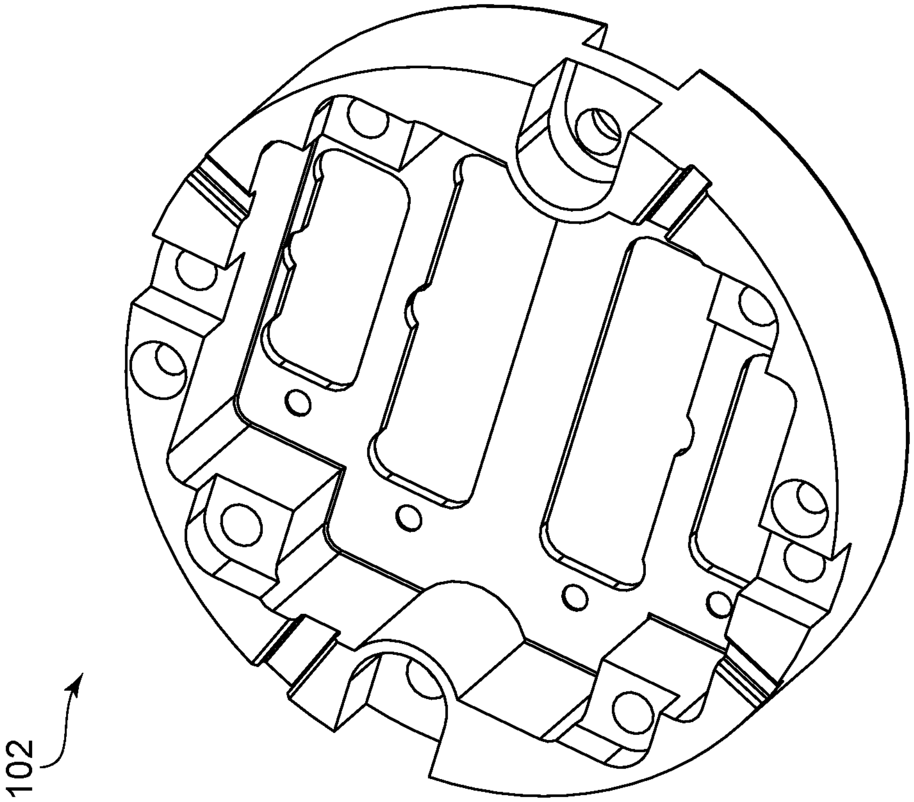
FIG. 5 is a bottom perspective view of a body of the connector saver of FIGS. 1-3 in isolation, according to an embodiment.

Referring now to FIG. 5, shown therein is body 102 of connector saver 100 of FIGS. 1 to 3. Body 102 is pictured in isolation, with additional components not visible.

Referring now to FIG. 6, shown therein is jacking fastener 110 of connector saver 100 of FIGS. 1 to 3. Jacking fastener 110 is pictured in isolation, with retaining element 116 and threaded portion 118 visible.

In operation, the device 100 may be attached to a target connector, such as target connector 200, through the manual placement of device 100 by an operator. Device 100 may be roughly aligned with target connector 200 by an operator or robotic system, and device 100 may be slowly brought towards target connector 200. Target connector 200 and device 100 may first interact when alignment pins 222 contact alignment ports 122, and target connector 200 and device 100 are urged into the correct relative position via interfacing of the alignment pins and alignment ports 122. Device 100 may be further brought towards target connector 200 until connectors 104 and 106 mate with connectors 204 and 206.

Jacking fasteners 110 may then be tightened to secure device 100 to target connector 200. Jacking fasteners 110 may preferably be tightened in parallel, wherein one jacking fastener 110 is tightened a certain amount (e.g., a quarter or half turn), then the other jacking fastener 110 is tightened by the same amount (e.g., a quarter or half turn), with this sequence repeated until both jacking fasteners 110 have been sufficiently torqued. This parallel tightening operation may advantageously prevent binding of connectors, or other connection issues which may arise from misalignment. In some embodiments, two tools may be operated simultaneously to tighten jacking fasteners 110 fully in parallel.

After jacking fasteners 110 are tightened, device 100 is fully installed. The device 100 may remain installed and be used until the connectors of device 100 are degraded, at which point device 100 can be removed and replaced.

When an external device is connected to device 100, electrical signals and power may be transmitted from device 100 to target connector 200, or vice versa, through connectors 104, 106, from female ends of connectors 104, 106, to male ends of connectors 104, 106, and into connectors 204, 206.

To detach device 100 from target connector 200, a similar operation as described above may be conducted in reverse.

Referring now to FIGS. 7 to 10, pictured therein are cross sectional views of device 100 in various stages of attachment to target connector 200, depicting the detaching process, according to an embodiment.

Figure 7:
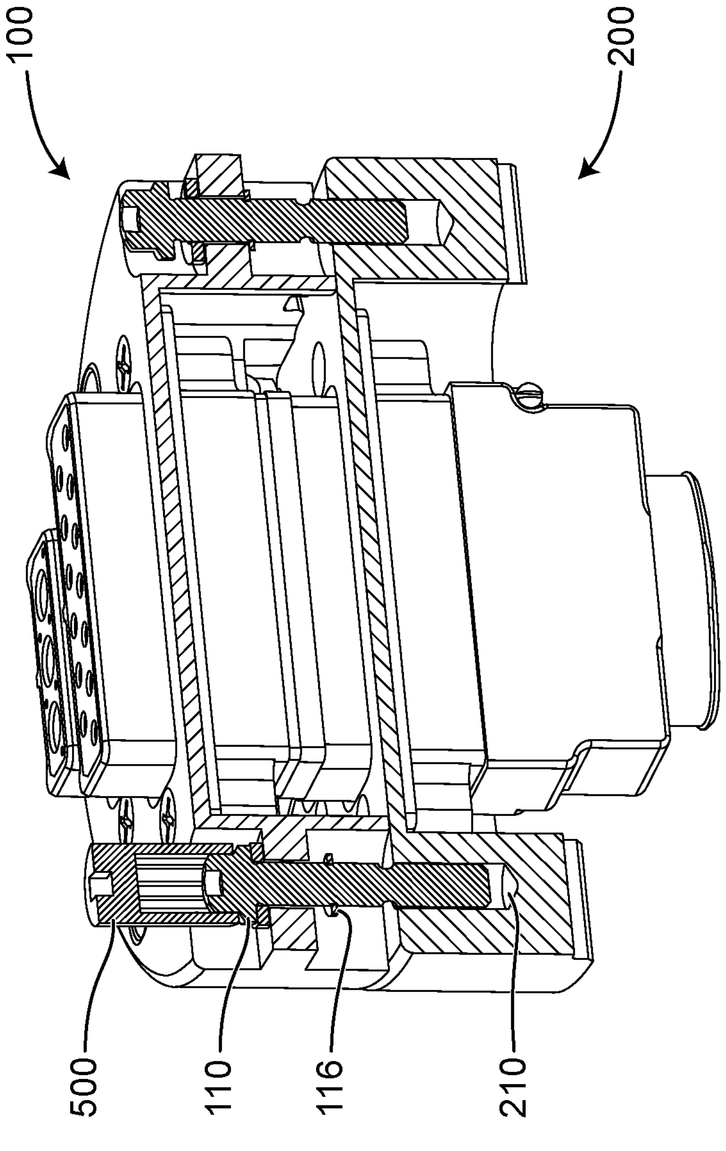
FIG. 7 is a perspective cross section view of the connector saver of FIGS. 1-3, coupled to the target of FIG. 4, according to an embodiment.

FIG. 7 shows device 100 and target connector 200 fully mated.

Figure 8:
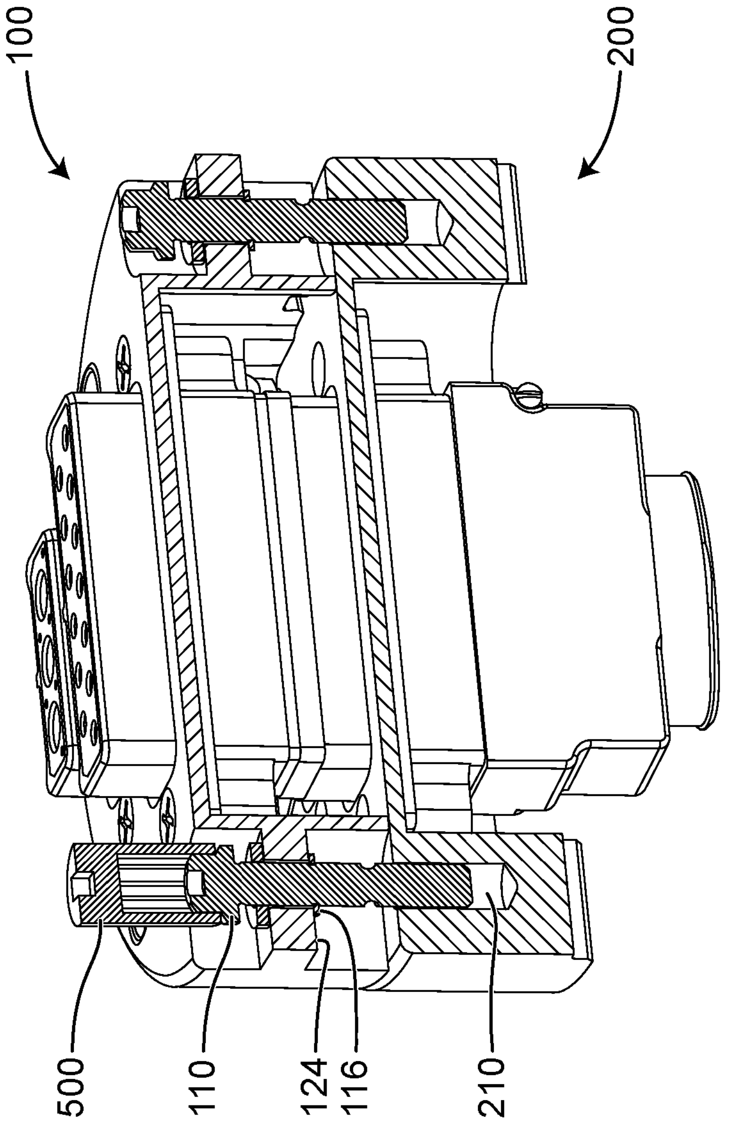
FIG. 8 is a perspective cross section view of the connector saver of FIGS. 1-3, coupled to the target of FIG. 4, with jacking fasteners partially loosened, according to an embodiment.

FIG. 8 shows device 100 and target connector 200 partially mated, wherein jacking fasteners 110 have been partially loosened with tool 500.

Figure 9:
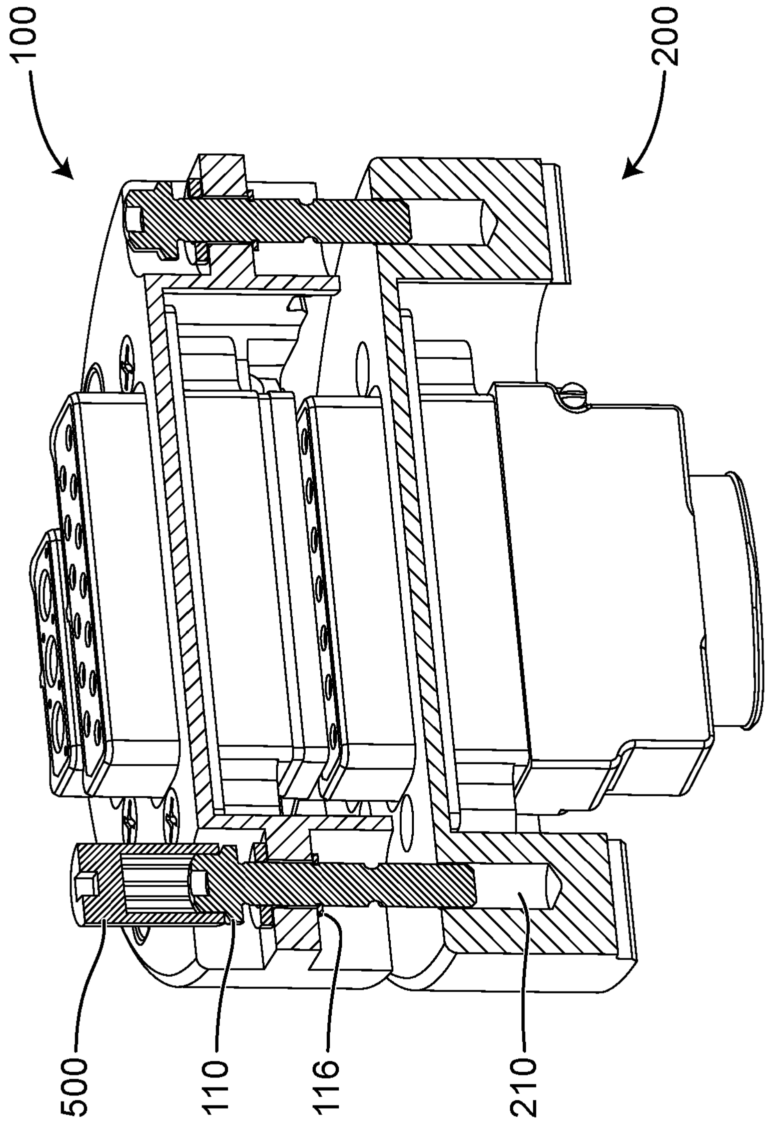
FIG. 9 is a perspective cross section view of the connector saver of FIGS. 1-3, partially uncoupled from the target of FIG. 4, with connectors unmated, according to an embodiment.

FIG. 9 shows device 100 and target connector 200 partially mated, wherein jacking fasteners 110 have been partially loosened with tool 500, and device 100 has been jacked away from connector 200 such that connectors are not engaged.

Figure 10:
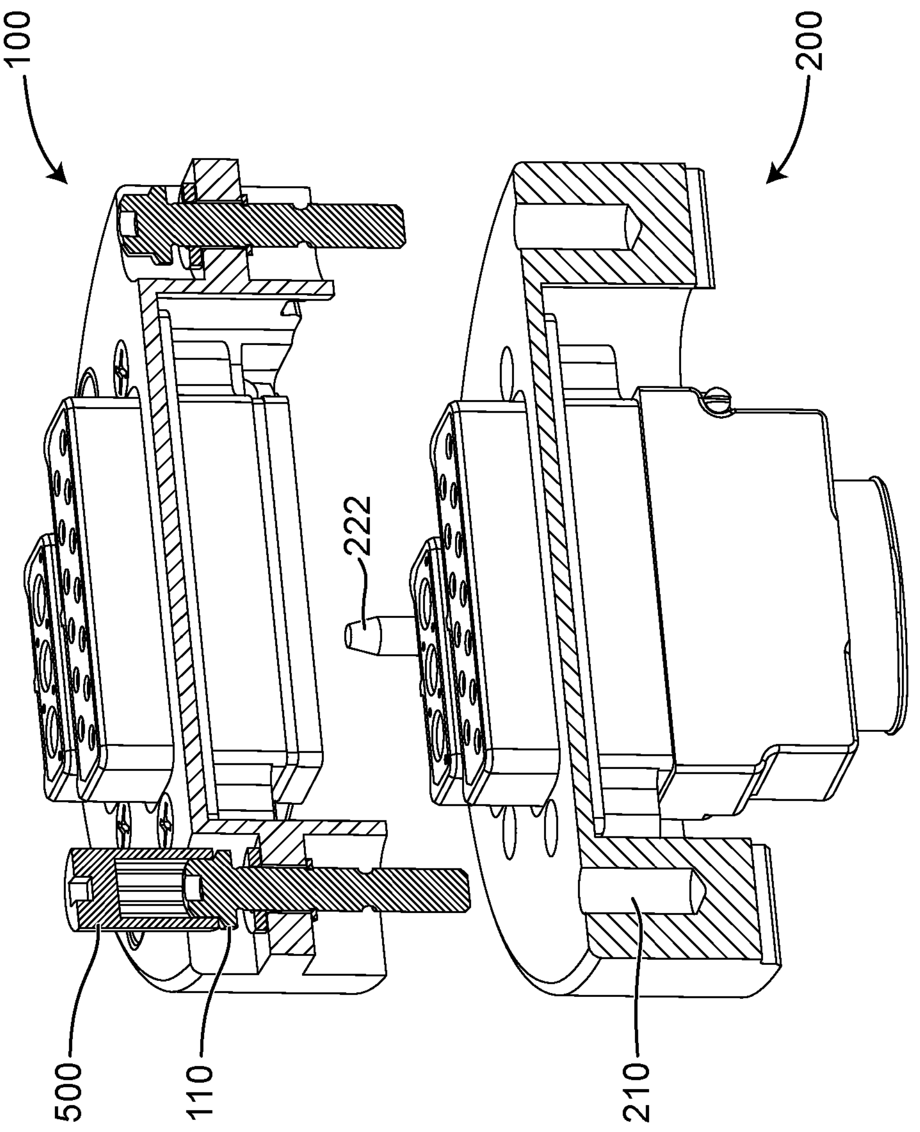
FIG. 10 is a perspective cross section view of the connector saver of FIGS. 1-3, fully uncoupled from the target of FIG. 4, with jacking fasteners completely unmated, according to an embodiment.

FIG. 10 shows device 100 and target connector 200 fully detached, wherein jacking fasteners 110 have been fully loosened with tool 500 such that jacking fasteners 110 are not engaging or contacting connector 200, and device 100 has been jacked away from connector 200 such that device 100 and connector 200 are fully separated.

Jacking fasteners 110 may be loosened to separate device 100 from target connector 200. Jacking fasteners 110 may preferably be loosened in parallel, wherein one jacking fastener 110 is loosened a certain amount (e.g., a quarter or half turn), then the other jacking fastener is loosened by the same amount (e.g., a quarter or half turn), with this sequence repeated until both jacking fasteners 110 have been sufficiently loosened and the threads of threaded portion 118 do not engage with the threads of threaded apertures 210. This parallel loosening operation may advantageously prevent binding of connectors, or other connection issues which may arise from misalignment. In some embodiments, two tools may be operated simultaneously to loosen jacking fasteners 110 fully in parallel.

During the loosening process, retaining elements 116 will at some point contact surface 124 of body 102 (as seen in FIGS. 2 and 8). Surface 124 is a surface of body 102 that faces and is generally parallel to a top surface of a body of the target connector 200 to which the device 100 is applied. Once retaining elements 116 contact surface 124 of body 102, the retaining elements 116 begin to transfer an outward force onto device 100 through surface 124. This force originates from the loosening of jacking fasteners 110. This outward force applied onto device 100 by retaining elements 116 may provide a jacking force required to overcome the frictional forces generated by the interactions of the connectors 104, 106, 204, 206 of device 100 and target connector 200 respectively, which couple device 100 to target connector 200.

Such a jacking functionality provided for by the combination of jacking fasteners 110, retaining elements 116, and the configuration of body 102 advantageously allow the device 100 to be detached from target connector 200 without the application of any additional external force, other than that required to loosen jacking fasteners 110. Such functionality may be particularly advantageous in space applications, wherein operators may wear thick gloves when performing extra-vehicular operations, which may give rise to difficulties in grasping and removing device 100 from target connector 200. An in-progress depiction of the jacking process is visible in FIG. 9.

Once jacking fasteners have been completely loosened, as seen in FIG. 10, jacking device 100 away from target connector 200, device 100 may be easily removed by an operator or robotic system, as little or no remaining frictional forces couple device 100 to target connector 200. A new device 100 may be installed onto target connector 200 as previously described.

Figure 11:
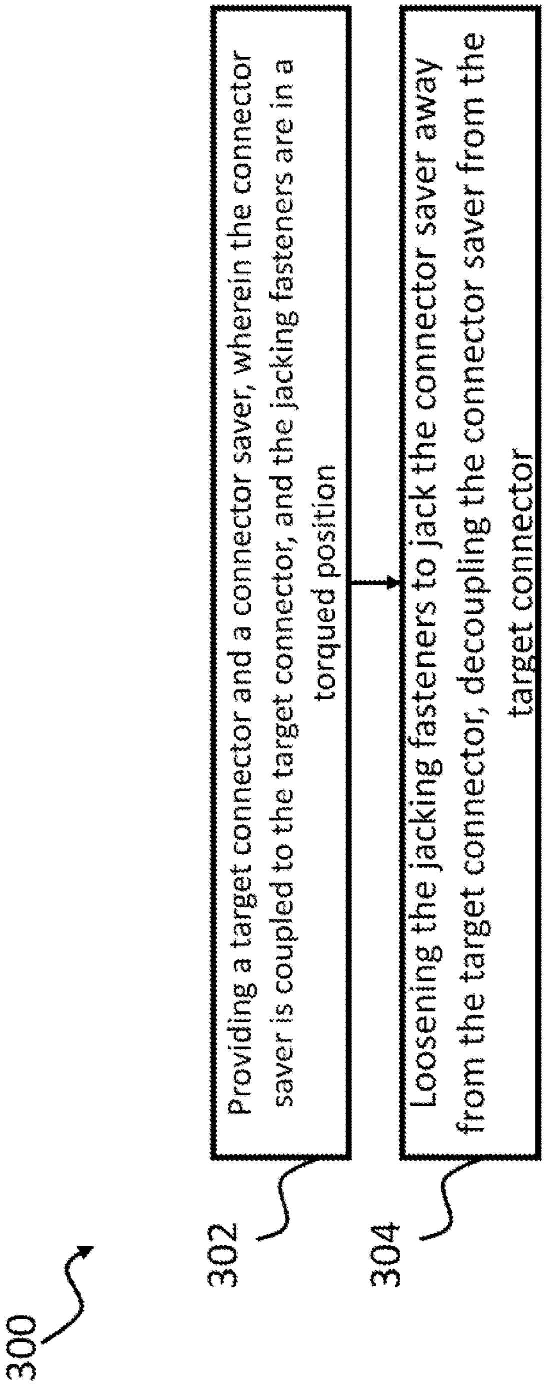
FIG. 11 is a flowchart of a method of operating the connector saver of FIGS. 1-3, according to an embodiment.

Referring now to FIG. 11, pictured therein is a flow chart depicting a method 300 of operating device 100 of FIGS. 1 to 3, according to an embodiment.

At 302, a target connector 200 and a connector saver 100 are provided, wherein the connector saver 100 is coupled to the target connector 200, and the jacking fasteners 110 of the connector saver 100 are in a torqued position.

At 304, the jacking fasteners 110 are loosened, jacking the connector saver away from the target connector, decoupling the connector saver from the target connector.

Figure 12:
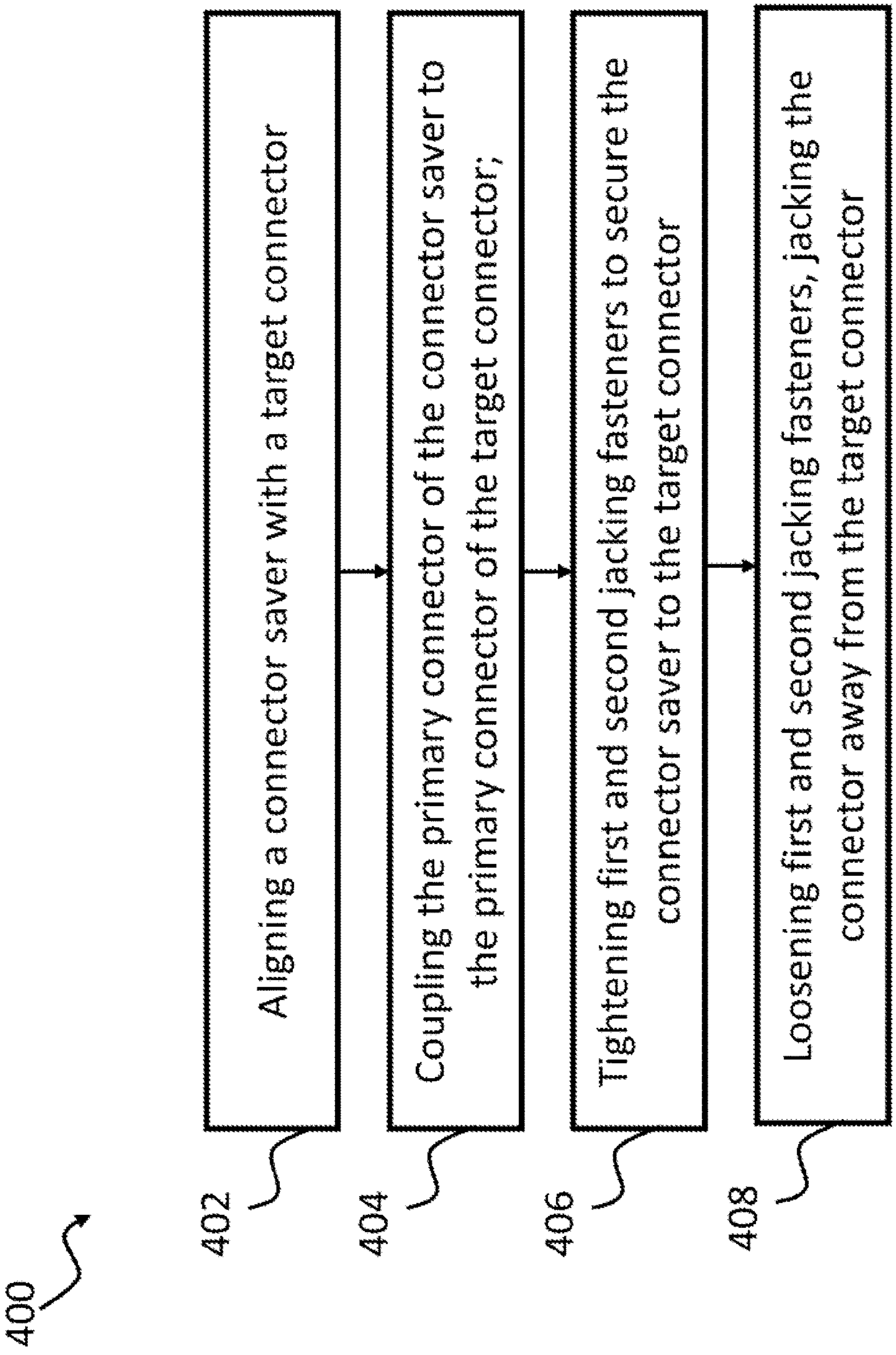
FIG. 12 is a flowchart of a method of protecting a connector, according to an embodiment.

Referring now to FIG. 12, pictured therein is a flow chart depicting a method 400 of protecting a connector, according to an embodiment.

At 402, a connector saver is aligned with a target connector. The connector saver may be connector saver 100. The target connector may be target connector 200.

At 404, the primary connector of the connector saver is coupled to the primary connector of the target connector.

At 406, first and second jacking fasteners are tightened to secure the connector saver to the target connector.

At 408, first and second jacking fasteners are loosened, jacking the connector away from the target connector.

Figure 13:
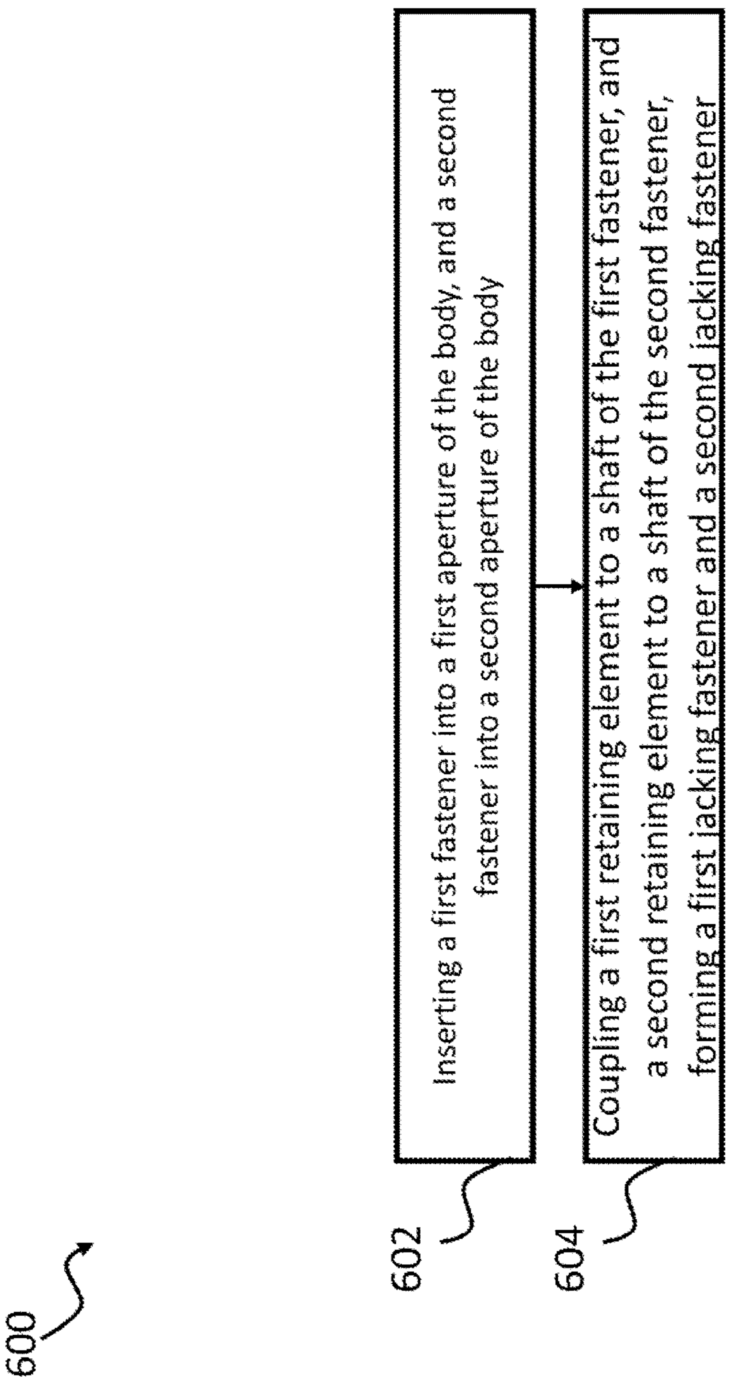
FIG. 13 is a flowchart of a method of manufacturing the connector saver of FIGS. 1-3, according to an embodiment.

Referring now to FIG. 13, pictured therein is a flow chart depicting a method 600 of manufacturing a connector saver, according to an embodiment. The connector saver may be connector saver 100.

At 602, a first fastener is inserted into a first aperture of a body of the connector saver, and a second fastener is inserted into a second aperture of the body.

At 604, a first retaining element is coupled to a shaft of the first fastener, and a second retaining element is coupled to a shaft of the second fastener, forming a first jacking fastener and a second jacking fastener.

While the above description provides examples of one or more apparatus, methods, or systems, it will be appreciated that other apparatus, methods, or systems may be within the scope of the claims as interpreted by one of skill in the art.

The invention claimed is:

1. A connector saver for an electromechanical interface for protecting a target connector from ingress of contaminant, the connector saver comprising:

a body comprising:

a wall having an inward-facing surface and an outward-facing surface;

first and second apertures extending through the wall between the inward-facing surface and the outward-facing surface;

a first connector, disposed on and extending through the wall between the inward-facing surface and the outward-facing surface, for transmitting electrical current; and a first jacking fastener and a second jacking fastener for securing the connector saver to a target connector and removing the connector saver from the target connector, the first jacking fastener for disposing in the first aperture and the second jacking fastener for disposing in the second aperture, each of the first and second jacking fasteners further comprising a retaining element coupled to a shaft of the respective jacking fastener, the retaining element configured such that (i) the retaining element prevents the respective jacking fastener from being separated from the body when the jacking fastener is disposed in the respective aperture, and (ii) the retaining element applies a jacking force to the body when the respective jacking fastener is loosened, thereby jacking the body away from the target connector to ease removal of the connector saver.

2. The connector saver of claim 1, further comprising a redundant connector disposed on the surface of the body, and wherein the first connector and the redundant connector each comprise two connectors.

3. The connector saver of claim 1, further comprising a tethering point coupled to the body, the tethering point for securing the connector saver to an external mounting point.

4. The connector saver of claim 1, further comprising an alignment port for aligning the connector saver during mating to the target connector, the alignment port configured to mate with a corresponding alignment feature of the target connector.

5. The connector saver of claim 1, wherein the first and second jacking fasteners are captive fasteners.

6. The connector saver of claim 1, wherein the first connector is configured to mate with a target connector interface of the target connector, the target connector having a housing including a surface on which the target connector interface is disposed; and wherein the inward-facing surface comprises a geometry complementary to the surface of the housing such that, when the first connector is mated to the target connector interface, the inward-facing surface of the body is positioned in close-fitting relation to the surface of the housing.

7. The connector saver of claim 1, wherein the first connector includes a first connector interface exposed on the inward-facing surface of the wall and a second connector interface exposed on the outward-facing surface of the wall, wherein the first connector interface is configured to mate with a target connector interface of the target connector, and wherein the second connector interface is substantially identical in form factor to the target connector interface.

8. The connector saver of claim 4, wherein the alignment port comprises a recess with a tapered or conical profile and the alignment feature is an alignment pin with a tapered or conical tip.

9. The connector saver of claim 1, further comprising first and second alignment ports, separate and distinct from the first and second apertures, for aligning the connector saver during mating to the target connector, the first and second alignment ports configured to mate with respective first and second alignment features on the target connector, wherein the first and second alignment ports are offset from one another.

10. The connector saver of claim 9, wherein the offset includes having the first and second alignment ports generally opposite one another along a perimeter of the body.

11. The connector saver of claim 4, wherein the first aperture, the second aperture, and the alignment port are disposed such that the first jacking fastener, the second jacking fastener, and the alignment feature are substantially parallel to one another when the connector saver is secured to the target connector.

12. The connector saver of claim 1, wherein the first and second jacking fasteners each include a threaded portion that is received by a threaded receiver on the target connector.

13. The connector saver of claim 1, wherein the retaining element is an annular or disc shaped element protruding from a body of the respective jacking fastener.

14. The connector saver of claim 1, further comprising at least two grooves or channels in the body of the connector saver that promote alignment with the target connector when mating.

15. The connector saver of claim 14, wherein the at least two grooves or channels includes a first groove or channel and a second groove or channel that are offset from one another.

16. A method of protecting an electrical connector, the method comprising:

aligning a connector saver with a target connector, the target connector comprising a first target connector and the connector saver comprising:

a body comprising:

a wall having an inward-facing surface and an outward-facing surface;

first and second apertures extending through the wall between the inward-facing surface and the outward-facing surface;

a first connector, disposed on and extending through the wall between the inward-facing surface and the outward-facing surface, for transmitting electrical current; and a first jacking fastener and a second jacking fastener for securing the connector saver to a target connector and removing the connector saver from the target connector, the first jacking fastener for disposing in the first aperture and the second jacking fastener for disposing in the second aperture, each of the first and second jacking fasteners further comprising a retaining element coupled to a shaft of the respective jacking fastener, the retaining element configured such that (i) the retaining element prevents the respective jacking fastener from being separated from the body when the jacking fastener is disposed in the respective aperture, and (ii) the retaining element applies a jacking force to the body when the respective jacking fastener is loosened, thereby jacking the body away from the target connector to ease removal of the connector saver;

coupling the first connector of the connector saver to the first target connector of the target connector;

tightening the first and second jacking fasteners to secure the connector saver to the target connector; and loosening first and second jacking fasteners, jacking the connector saver away from the target connector.

17. The method of claim 16, wherein the aligning comprises aligning alignment features of the target connector with respective complimentary alignment ports of the connector saver.

18. The method of claim 16, wherein the coupling comprises mating alignment features of the target connector with respective complimentary alignment ports of the connector saver which when mated, urge the connector saver into alignment with the target connector.

19. A method of manufacturing a connector saver for an electromechanical interface for protecting a target connector from ingress of contaminant, the connector saver configured to couple to the target connector, the method comprising:

inserting a first fastener into a first aperture of a body of the connector saver, and a second fastener into a second aperture of the body;

wherein the body includes a wall having an inward-facing surface and an outward-facing surface, the first and second apertures extending through the wall between the inward-facing surface and the outward-facing surface;

wherein a first connector is disposed on and extends through the wall between the inward-facing surface and the outward-facing surface, for transmitting electrical current; and coupling a first retaining element to a shaft of the first fastener and a second retaining element to a shaft of the second fastener when the first and second fasteners are inserted into the first and second apertures, forming a first jacking fastener and a second jacking fastener, the retaining elements preventing each respective jacking fastener from removal from each respective aperture by mechanically interfering with the body.

20. The method of claim 19, wherein the connector saver is configured such that when the connector saver is coupled to the target connector and the jacking fasteners are torqued, the retaining element applies a jacking force to the body when each respective jacking fastener is loosened, thereby jacking the body away from the target connector to facilitate removal of the connector saver.

* * * * *